(12) United States Patent
Matsushita et al.

(10) Patent No.: US 9,898,697 B2
(45) Date of Patent: Feb. 20, 2018

(54) SUPPORT DEVICE FOR BAND-SHAPED SHEET, AND METHOD FOR MANAGING BAND-SHAPED SHEET

(71) Applicant: LINTEC CORPORATION, Tokyo (JP)

(72) Inventors: Kaori Matsushita, Tokyo (JP); Katsumi Katakura, Tokyo (JP); Masayuki Narukawa, Tokyo (JP); Kenichi Watanabe, Tokyo (JP); Naoya Okamoto, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/127,907

(22) PCT Filed: Mar. 18, 2015

(86) PCT No.: PCT/JP2015/058136
§ 371 (c)(1),
(2) Date: Sep. 21, 2016

(87) PCT Pub. No.: WO2015/151821
PCT Pub. Date: Oct. 8, 2015

(65) Prior Publication Data
US 2017/0103295 A1    Apr. 13, 2017

(30) Foreign Application Priority Data

Apr. 4, 2014    (JP) .................................. 2014-077913

(51) Int. Cl.
G06K 19/077    (2006.01)
H01Q 7/00    (2006.01)
H01Q 1/22    (2006.01)

(52) U.S. Cl.
CPC .... *G06K 19/0776* (2013.01); *G06K 19/07779* (2013.01); *H01Q 1/2216* (2013.01); *H01Q 7/00* (2013.01)

(58) Field of Classification Search
USPC ........................................................ 235/488
See application file for complete search history.

(56) References Cited

U.S. PATENT DOCUMENTS

2010/0309088 A1    12/2010    Hyvonen et al.

FOREIGN PATENT DOCUMENTS

JP    3883269 B2    2/2007
JP    2013-016545 A    1/2013
(Continued)

OTHER PUBLICATIONS

Search Report issued in corresponding International Application No. PCT/JP2015/058136, dated Apr. 21, 2015.

*Primary Examiner* — Allyson Trail
(74) *Attorney, Agent, or Firm* — McDermott Will & Emery LLP

(57) ABSTRACT

A support device, which supports a belt-shaped sheet wound around a hollow cylindrical shaft core so as to feed the belt-shaped sheet, includes a support shaft that is insertable into a hollow part of the shaft core, a frame that supports the support shaft, an antenna surface perpendicular to an axis line of the support shaft, and a loop antenna provided to the antenna surface. The shaft core includes a non-contact data carrier capable of at least one of storing and transmitting predetermined data. The loop antenna includes a loop unit coiled to define a loop surrounding the axis line. When the shaft core is seen through the loop antenna along the axis line, the loop unit is disposed in the vicinity of the shaft core.

8 Claims, 4 Drawing Sheets

(56) References Cited

FOREIGN PATENT DOCUMENTS

| | | |
|---|---|---|
| JP | 2013-114600 A | 6/2013 |
| JP | 2013-114601 A | 6/2013 |
| WO | 2008/087841 A1 | 7/2008 |
| WO | 2013/154552 A1 | 10/2013 |

SUPPORT DEVICE FOR BAND-SHAPED SHEET, AND METHOD FOR MANAGING BAND-SHAPED SHEET

CROSS REFERENCE

This application is the U.S. National Phase under 35 U.S.C. § 371 of International Application No. PCT/JP2015/058136, filed on Mar. 18, 2015, which claims the benefit of Japanese Application No. 2014-077913, filed on Apr. 4, 2014, the entire contents of each are hereby incorporated by reference.

TECHNICAL FIELD

The present invention relates to a support device for a belt-shaped sheet and a method for managing the belt-shaped sheet.

BACKGROUND ART

Heretofore, there has been known an adhering apparatus configured to unwind a belt-shaped adhesive sheet and adhere the adhesive sheet to a wafer, in which a data carrier is provided to a shaft core around which an adhesive sheet is wound, and data stored in the data carrier is read out, so as to appropriately set adhering conditions for the adhesive sheet (see, for instance, Patent Literature 1).

In a support device of Patent Literature 1, a loop antenna is disposed on an antenna surface perpendicular to an axis line of a support shaft for supporting the shaft core so that the loop antenna surrounds the axis line. A data carrier is provided to the shaft core, and the loop antenna communicates with the data carrier. It is disclosed in Patent Literature 1 that the support device eliminates the need for a fine positional adjustment for supporting the shaft core to achieve the communication between the data carrier and the loop antenna.

In addition, some of known devices include a support device in which a loop antenna and a data carrier are disposed in the vicinity of a metallic frame, an adhering apparatus in which a belt-shaped sheet is supported in a metallic casing or the like.

CITATION LIST

Patent Literature(s)

Patent Literature 1 JP-A-2013-16545

SUMMARY OF THE INVENTION

Problems to be Solved by the Invention

When a metallic member, casing or the like is disposed in the vicinity of the loop antenna or the data carrier, it is likely that the communication between the data carrier and the loop antenna becomes unstable. Accordingly, a technology to achieve more stable communication even when a metallic member or the like is disposed has been desired.

An object of the invention is to provide a support device for a belt-shaped sheet capable of achieving stable communication between a data carrier and a loop antenna, and a method for managing the belt-shaped sheet.

Means for Solving the Problems

In order to achieve the above object, according to an aspect of the invention, a support device for a belt-shaped sheet, which is configured to support a belt-shaped sheet wound around a shaft core having a hollow cylindrical shape in a manner capable of feeding the belt-shaped sheet, includes: a support shaft configured to be inserted into a hollow part of the shaft core; a frame that is configured to support the support shaft; an antenna surface perpendicular to an axis line of the support shaft; and a loop antenna provided on the antenna surface. The shaft core is provided with a non-contact data carrier capable of at least one of storing and transmitting predetermined data. The loop antenna includes a loop unit coiled to define a loop so as to surround the axis line. The loop unit of the loop antenna is disposed in the vicinity of the shaft core when the shaft core is seen through the loop antenna along the axis line.

In the above arrangement, the shaft core preferably has a first end portion provided at a first end and a second end portion provided at a second end in an axial direction of the shaft core, the frame is preferably provided near the first end portion, and the antenna surface is preferably provided near the second end portion.

In the above arrangement, a profile of the shaft core preferably overlaps a profile of the loop unit of the loop antenna when the shaft core is seen through the loop antenna along the axis line.

In the above arrangement, the shaft core may have a hollow cylindrical shape, and the loop unit may have a circular shape. A diameter of a cylinder of the shaft core is preferably the same as a diameter of the loop unit.

In the above arrangement, the data carrier preferably includes a coiled antenna, and a longitudinal direction of the coiled antenna preferably extends along the axis line.

In order to achieve the above object, according to an aspect of the invention, a method for managing a belt-shaped sheet that is supported by a supporting device in a manner capable of being fed, the supporting device including a support shaft configured to be inserted into a hollow part of a shaft core having a hollow cylindrical shape, a frame that is configured to support the support shaft, an antenna surface perpendicular to an axis line of the support shaft, and a loop antenna provided on the antenna surface and having a loop unit coiled to define a loop so as to surround the axis line, the method includes: winding the belt-shaped sheet around the shaft core; providing the shaft core with a data carrier capable of at least one of storing and transmitting predetermined data; disposing the loop unit of the loop antenna in the vicinity of the shaft core when the shaft core is seen through the loop antenna along the axis line; and performing at least one of storing and transmitting of the predetermined data between the data carrier and the loop antenna.

In the above arrangement, the loop unit of the loop antenna is disposed in the vicinity of the shaft core when the shaft core is seen through the loop antenna along the axis line, and therefore the magnetic flux emitted from the loop antenna easily passes through the data carrier. As a result, it is possible to achieve stable communication between the data carrier and the loop antenna. Here, the term "vicinity" means that the loop unit of the loop antenna is positioned such that the magnetic flux generated by the loop antenna can pass through the data carrier.

In the above arrangement, when the frame is disposed near the first end portion of the shaft core and the antenna surface is disposed near the second end portion of the shaft core, the loop antenna can be disposed at a position remote from the metallic frame. Accordingly, the communication between the data carrier and the loop antenna can be more stably performed. Further, when the shaft core provided with the data carrier is provided to the support shaft, since the data carrier is disposed near the second end portion, the possibility of the IC chip or the like provided to the data carrier being damaged due to the contact between the data carrier and the support shaft is decreased.

In the above arrangement, in the case where the profile of the shaft core overlaps the profile of the loop unit of the loop antenna when the shaft core is seen through the loop antenna along the axis line, the amount of the magnetic flux that passes through the data carrier is increased. Accordingly, the communication between the data carrier and the loop antenna are performed more stably.

In the above arrangement, when the shaft core has a hollow cylindrical shape, the loop unit of the loop antenna has a circular shape and the diameter of the cylinder of the shaft core is the same as the diameter of the loop unit, the amount of the magnetic flux that passes through the data carrier can be further increased. Additionally, even when the shaft core rotates about the axis line, fluctuation in the degree of overlapping between the profile of the shaft core and the profile of the loop unit of the loop antenna can be suppressed. Accordingly, it is possible to further improve the accuracy of the communication between the data carrier and the loop antenna. Additionally, even while the shaft core is being rotated (e.g., at the time of feeding the belt-shaped sheet), the communication between the data carrier and the loop antenna can be stably performed.

In the above arrangement, when the data carrier has a coiled antenna and the longitudinal direction of the coiled antenna extends along the axis line of the shaft core, a larger amount of the magnetic flux emitted from the loop antenna toward the axis line passes through the coiled antenna. Namely, it is possible to further increase the amount of the magnetic flux passing through the coiled antenna of the data carrier. Thus, it is possible to further improve the accuracy of the communication between the data carrier and the loop antenna.

In the above arrangement, the loop unit of the loop antenna is disposed in the vicinity of the shaft core when the shaft core is seen through the loop antenna along the axis line. Then, one of the storing and transmitting of the predetermined data between the data carrier and the loop antenna is performed. Therefore, the magnetic flux emitted from the loop antenna easily passes through the data carrier. Accordingly, it is possible to perform the stable communication between the data carrier and the loop antenna, and the accuracy of management of the belt-shaped sheet can be improved.

DESCRIPTION OF EMBODIMENT(S)

Exemplary embodiments of the invention will be described below with reference to the attached drawings. It is to be noted that, in each figure, the shape and arrangement of each component are illustrated in an emphasized manner in order to facilitate the understanding of the invention. All expressions indicating directions such as "up", "down", "left", "right", "front" and "back" will be used with reference to FIG. 1 when a figure as a standard is not specified in each exemplary embodiment.

First Exemplary Embodiment

Figure 1:
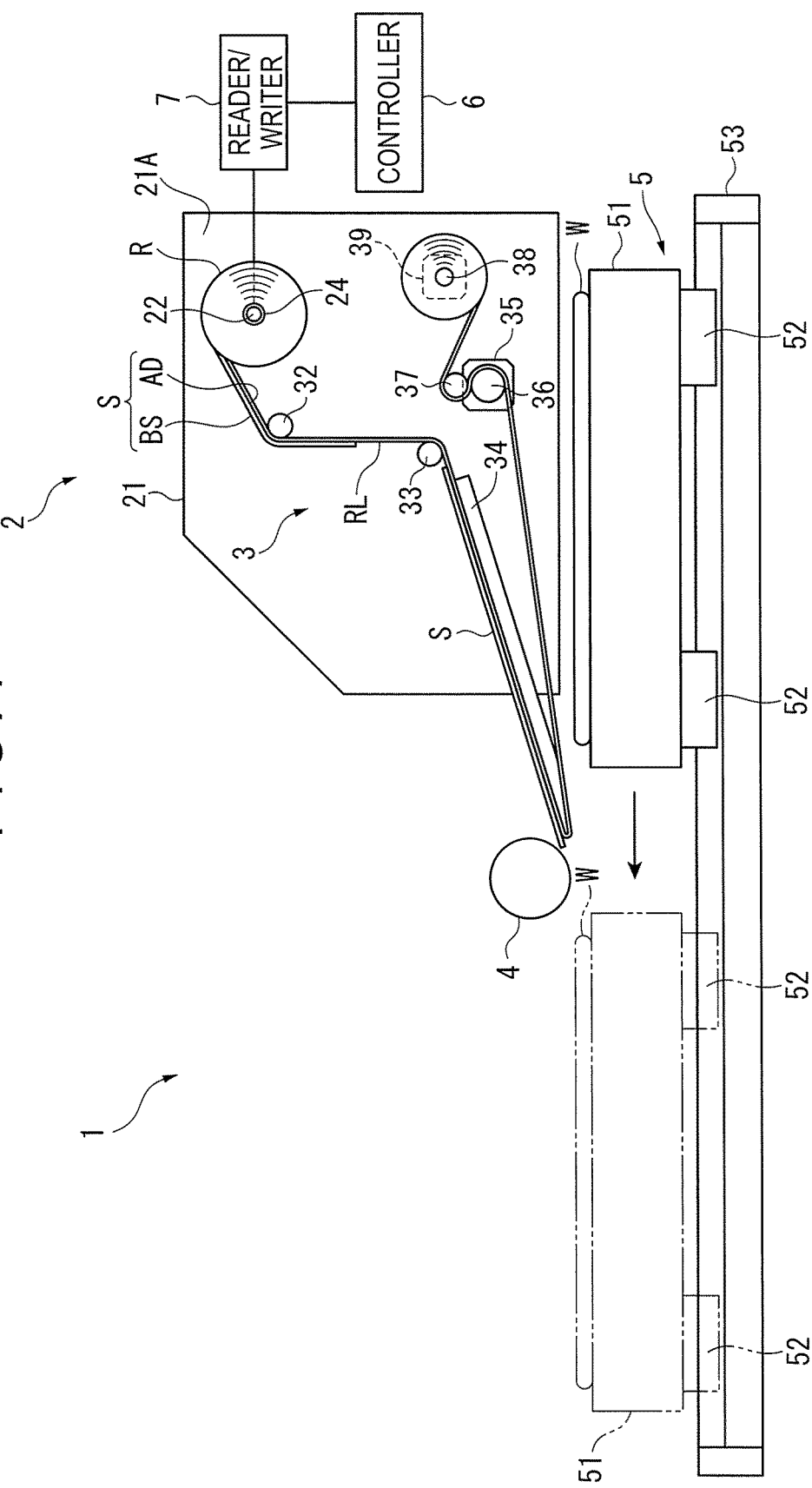
FIG. 1 is a side view of an adhering apparatus according to an exemplary embodiment of the invention.

In FIG. 1, an adhering apparatus 1 is configured to adhere an adhesive sheet S to a semiconductor wafer (hereinafter referred to as "wafer") W.

An adhesive sheet S is a belt-shaped sheet including a base sheet BS, an adhesive agent layer AD laminated on one of surfaces of the base sheet BS, and a releasable sheet RL temporarily adhered to the base sheet BS through the adhesive agent layer AD. The adhesive sheet S is wound around an outer circumference of a shaft core 24 having a hollow cylindrical shape so as to be prepared as a material sheet R in advance.

The adhering apparatus 1 includes a support device 2 that is configured to support the adhesive sheet S in a manner capable of feeding the adhesive sheet S, a feeder 3 that is configured to feed the adhesive sheet S, a pressing section 4 that is configured to press the fed adhesive sheet S onto the wafer W so that the adhesive sheet S is adhered to the wafer W, and a moving section 5 that is configured to relatively move the wafer W and the pressing section 4. An overall operation of the adhering apparatus 1 is controlled by a controller 6 such as a personal computer and a sequencer.

The support device 2 includes a frame 21, and a support 22 disposed on a first surface 21A of the frame 21. The support 22 includes a support shaft 221. The support shaft 221 is inserted into a hollow part of the shaft core 24 from a first end of the shaft core 24 so that the support 22 supports the shaft core 24.

The feeder 3 is entirely supported by the frame 21. The feeder 3 includes a plurality of guide rollers 32 and 33 that are configured to guide the material sheet R, a releasing plate 34 that is configured to peel the adhesive sheet S from a releasable sheet RL of the material sheet R by folding back the releasable sheet RL, a drive roller 36 (a drive device) configured to be driven by a rotary motor 35, a pinch roller 37 that interposes the releasable sheet RL with the drive roller 36, and a collecting roller 38 that collects the releasable sheet RL by a rotary motor 39 (a drive device).

The pressing section 4 is made of an elastically deformable material such as rubber and resin. The pressing section 4 is rotatably supported by a support member (not shown), and movable upwardly and downwardly by a linear movement motor (not shown) as a drive device.

The moving section 5 includes a table 51 and a single-spindle robot 53 as a drive device having sliders 52 fixed to a lower surface of the table 51. The wafer W is provided on the table 51 so that the table 51 is capable of adsorbing and holding the wafer W using an adsorbing/holding device such as a decompression pump and a vacuum ejector (not shown). The moving section 5 is configured to slide the sliders 52, so as to move the table 51 in right-and-left directions.

Next, the support device 2 will be described.

Figure 2:
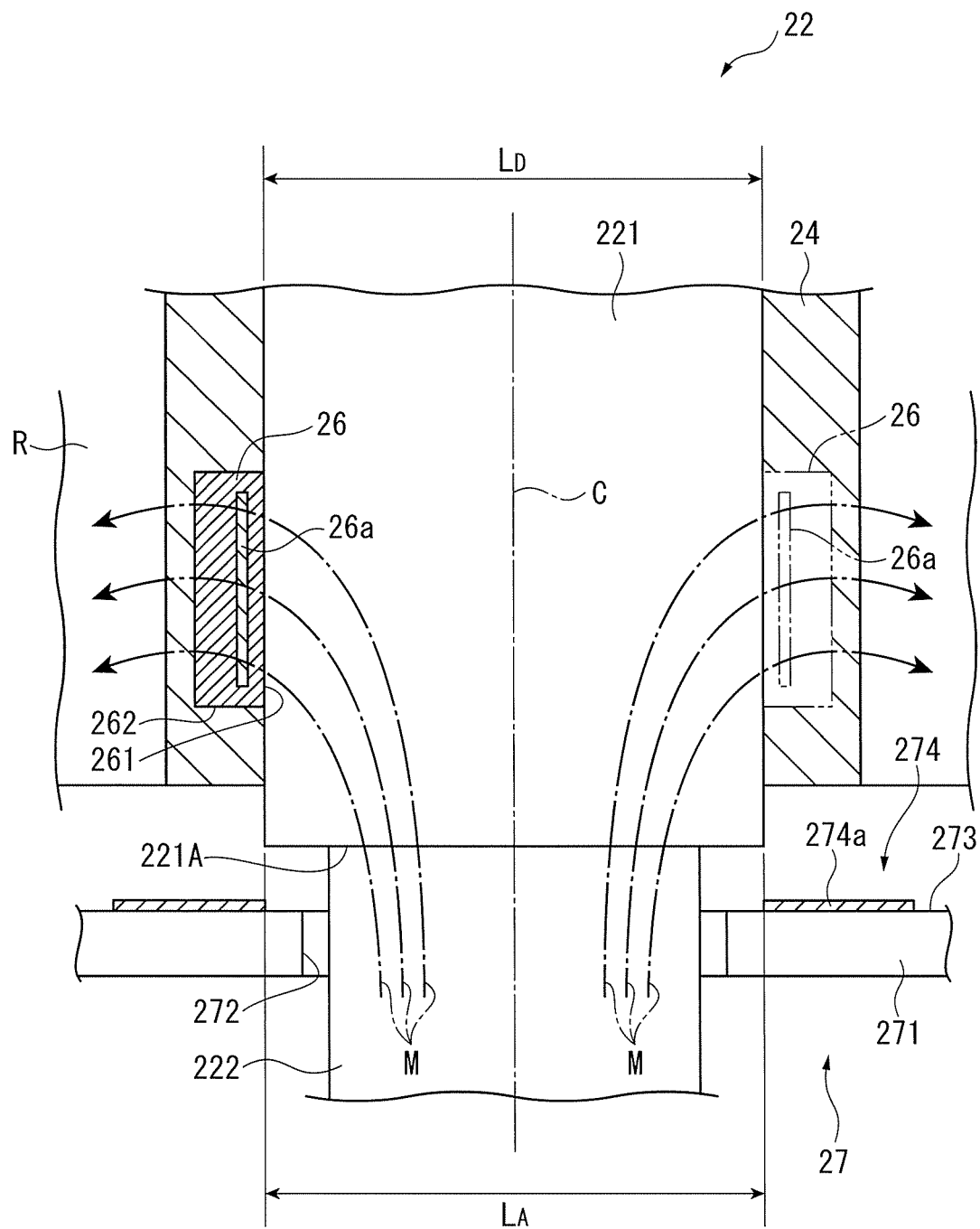
FIG. 2 is a partially enlarged view illustrating an arrangement of a loop antenna and a data carrier in a support device of the adhering apparatus.

The support 22 is positioned near the first surface 21A (see FIG. 1) of the frame 21. As shown in FIG. 2, the support 22 includes a support shaft 221 having a circular cylindrical shape and a base end 222 that is coaxial with an axis line C of the support shaft 221. It is to be noted that the frame 21 is not shown in FIG. 2. The base end 222 extends from a first end portion 221A at a first end of the support shaft 221. The base end 222 is rotatably supported by the frame 21. The support shaft 221 is preferably made of a material that allows passage of magnetic flux.

The support shaft 24 is preferably made of a material that allows passage of magnetic flux. As the material for the shaft core 24, paper or resin is used, for example. Examples of the resin for the shaft core 24 include polypropylene, acrylonitrile-butadiene-styrene copolymer, acrylonitrile-ethylene propylene rubber-styrene-copolymer, polyamide, polycarbonate, polyacetal, polyethylene, polystyrene, polyarylate, polyphenylene oxide, polymethyl methacrylate, polyvinyl chloride, polysulfone, polyether sulfone, polyphenylene sulfide, polyarylate, polyamideimide, polyetherimide, polyether ether ketone, polyimide, fluororesin, polyethylene terephthalate, and polybutylene terephthalate. The material for the shaft core 24 is not particularly limited to the resins described above.

A data carrier 26 is provided to the shaft core 24.

The data carrier 26 used in the first exemplary embodiment can read and store data in a non-contact manner, and can transmit the data in a non-contact manner through a communication medium in a form of an electromagnetic wave that is not affected by a material of the shaft core 24. Examples of the non-contact data carrier 26 include a so-called IC card and IC tag including an IC chip and a coiled antenna connected to the IC chip for transmission/reception of the data.

A label-shaped IC tag capable of storing the data is used as the IC tag. The IC tag can read and store data, and can transmit the data through a communication medium in a form of an electromagnetic wave. The IC tag includes an IC inlet, a surface sheet, and a double-sided adhesive sheet. The IC tag is adhered to the shaft core 24 through the double-sided adhesive sheet.

The IC inlet includes an IC chip that acts at a predetermined resonance frequency (e.g., 135 kHz or 13.56 MHz), a coiled antenna, and a circuit base material holding the IC chip and the coiled antenna.

Information related to the data may be printed on a surface of the surface sheet opposite to the IC inlet. Additionally, a bar code or two-dimensional code may be also indicated on the surface of the surface sheet opposite to the IC inlet. As the circuit base material and the surface sheet, a sheet material such as a synthetic resin film, paper material, and nonwoven fabric can be used. Examples of the synthetic resin film include films of polyethylene (PE), polypropylene (PP), polyethylene terephthalate (PET), polycarbonate (PC), polyurethane (PU), polyvinyl chloride (PVC), and polyimide. Examples of the paper material include high-quality paper, coated paper, kraft paper, and glassine paper.

The thickness of each of the circuit base material and the surface sheet is not particularly limited, and may be appropriately set in accordance with applications thereof. For example, the thickness of each of the circuit base material and the surface sheet is preferably 5 μm or more and 2000 μm or less, more preferably 10 μm or more and 500 μm or less.

The double-sided adhesive sheet may be formed, for example, of acrylic, silicone, rubber, polyester, and polyurethane adhesives. Above all, the acrylic adhesive is preferable because an adhesive force thereof is easily controlled. The thickness of the double-sided adhesive sheet is not particularly limited, and may be appropriately set in accordance with applications thereof. For example, the thickness of the double-sided adhesive sheet is preferably 1 μm or more and 300 μm or less, more preferably 5 μm or more and 150 μm or less. The double-sided adhesive sheet may further include a core.

The IC tag may further include a magnetic body layer on one of a surface of the circuit base material of the IC inlet (the surface facing the surface sheet) and the surface opposite thereto (the surface facing the double-sided adhesive sheet) in order to reduce an influence of the metal on the IC tag. The thickness of the magnetic body layer is not particularly limited, and may be appropriately set in accordance with applications thereof. For example, the thickness of the magnetic body layer is preferably 20 μm or more and 3000 μm or less, particularly preferably 50 μm or more and 1000 μm or less.

The data carrier 26 may be provided to an inner circumferential surface of the shaft core 24 or an outer circumferential surface of the shaft core 24.

Further, a cavity may be formed on the inner circumferential surface or the outer circumferential surface of the shaft core 24 so that the data carrier 26 is housed in the cavity. For example, when the data carrier 26 is housed in the cavity formed on the inner circumferential surface of the shaft core 24, it is possible to prevent contact between the support shaft 221 and the data carrier 26 at the time when the support shaft 221 is inserted into the hollow part of the shaft core 24, and thereby preventing breakage of the data carrier 26. Further, when the data carrier 26 is housed in the cavity formed on the outer circumferential surface of the shaft core 24, it is possible to prevent breakage of the data carrier 26 upon being pressed by the adhesive sheet S wound around the shaft core 24. When the data carrier 26 is provided with the IC chip, since the IC chip is easily broken by external stress, it is advantageous to prevent the IC chip from being in contact with the support shaft 221 and from being pressed by the adhesive sheet S that is wound around the shaft core 24

An antenna section 27 is mounted on the first surface 21A of the frame 21. The antenna section 27 includes a substrate 271. The substrate 271 is fixed to the surface 21A in a detachable manner. The substrate 271 has a substrate opening 272. An inner diameter of the substrate opening 272 is larger than a diameter of the support shaft 221.

An annular antenna is provided on the substrate 271. One of surfaces of the substrate 271 is an antenna surface 273 on which a circuit (not shown) is formed. The antenna surface 273 is provided with a loop antenna 274. The loop antenna 274 includes a loop unit 274a defined by winding an electric conductor into a loop. In the first exemplary embodiment, the loop unit 274a is coiled to define a circle.

The loop antenna 274 may be protected by a protection member. For example, the loop unit 274a may be covered by a cover as the protection member.

In the first exemplary embodiment, the position of the substrate 271 is adjusted, such that the base end 222 is inserted into the substrate opening 272, the axis line C of the support shaft 221 is perpendicular to the antenna surface 273, and the axis line C passes through the center of the loop antenna 274.

As described above, in the first exemplary embodiment, the shaft core 24 is a hollow cylindrical member, and the loop unit 274a of the loop antenna 274 is a circular member. Therefore, when the shaft core 24 is seen through the loop antenna 274 along the axis line C, the loop unit 274a is disposed in the vicinity of the shaft core 24.

Further, in the first exemplary embodiment, a diameter $L_D$ of the cylinder (i.e., inner diameter) of the shaft core 24 is the same as a diameter $L_A$ (i.e., inner diameter) of the loop unit 274a. Therefore, when the shaft core 24 is seen through the loop antenna 274 along the axis line C, a circle of the cylinder of the shaft core 24 overlaps a circle of the loop unit 274a.

In a state that the loop antenna 274 and the data carrier 26 are arranged as shown in FIG. 2, magnetic flux M is emitted from the loop antenna 274, and the magnetic flux M passes through the data carrier 26. In the first exemplary embodiment, since a member for positioning the shaft core 24 is not provided to the substrate 271 near the substrate opening 272, a degree of freedom in positioning the loop antenna 274 on the antenna surface 273 is increased. It becomes possible to dispose the loop antenna 274 near the substrate opening 272, that is, nearer to the data carrier 26.

When the data carrier 26 is the non-contact data carrier that includes the IC chip and the coiled antenna as described above, the coiled antenna may be disposed at any position through which the magnetic flux M generated by the loop antenna 274 passes. For example, the coiled antenna may be disposed on an opposed surface 261 of the data carrier 26 that faces the outer circumferential surface of the support shaft 221, or on a perpendicular surface 262 of the data carrier 26 that is perpendicular to the outer circumferential surface of the support shaft 221. The shape of the coiled antenna is not particularly limited. The coiled antenna may be, for example, in the shape of a circle, ellipse, square, rectangle, polygon, or an indefinite shape. When the coiled antenna has a shape with a longitudinal direction, such as the ellipse or rectangle, it is preferable that the longitudinal direction extends along the axis line C.

In the first exemplary embodiment, as shown in FIG. 2, the data carrier 26 includes the coiled antenna 26a. The coiled antenna 26a is disposed along the opposed surface 261, such that the amount of the magnetic flux M that passes through the data carrier 26 is increased. Further, the coiled antenna 26a is disposed such that the longitudinal direction of the coiled antenna 26a extends along the axis line C.

A reader/writer 7 shown in FIG. 1 is connected to the antenna section 27. The reader/writer 7 is configured to read the data stored in the data carrier 26 and write the data in the data carrier 26 under the control of the controller 6.

Examples of the data to be communicated between the data carrier 26 and the loop antenna 274 include: an ID of the IC chip; a type, material, product name and code of the adhesive sheet S; dimensional standards such as a thickness, length, width and diameter of the adhesive sheet S; a lot number of the material sheet R; a length of the used material sheet R; a length of the remaining material sheet R; a sell-by date of the adhesive sheet S; the number of the remaining adhesive sheets S before and after the start of feeding the adhesive sheet S; the number of the fed adhesive sheets S; a recommended feeding speed for optimally feeding the adhesive sheet S; conditions for optimally adhering the adhesive sheet S such as a recommended adhesion force and recommended pressing force; and contact information of consultation services for the adhesive sheet S and the material sheet R. Thus, the data that is read out from the data carrier 26 may be displayed on a monitor (not shown) provided to the adhering apparatus 1, and the conditions for adhering the adhesive sheet S by the adhering apparatus 1 may be set based on the data that is read out from the data carrier 26.

A method for managing a belt-shaped sheet according to the first exemplary embodiment can be performed using the support device 2 of the first exemplary embodiment.

At first, the support shaft 221 supports the shaft core 24. At this time, the position of the shaft core 24 is adjusted such that the loop unit 274a is disposed in the vicinity of the shaft core 24 when the shaft core 24 is seen through the loop antenna 274 along the axis line C.

In the first exemplary embodiment, since the diameter $L_D$ of the cylinder (i.e., inner diameter) of the shaft core 24 is the same as the diameter $L_A$ (i.e., inner diameter) of the loop unit 274a, the circle of the cylinder of the shaft core 24 overlaps the circle of the loop unit 274a. Further, at the time of supporting the shaft core 24, positioning of the shaft core 24 is performed to set a distance between the antenna section 27 and the data carrier 26 to a length appropriate for reading and writing the data. Thereafter, an electrical current is applied to the loop antenna 274 to generate the magnetic flux M, and at least one of storing and transmitting of predetermined data is performed between the data carrier 26 and the loop antenna 274. The communication between the data carrier 26 and the loop antenna 274 is controlled by the controller 6.

An adhering method according to the first exemplary embodiment can be performed using the adhering apparatus 1 of the first exemplary embodiment. In the adhering apparatus 1, in order to adhere the adhesive sheet S to the wafer W, at first, the support shaft 221 supports the shaft core 24. At the time, the positioning of the shaft core 24 is performed to set the distance between the antenna section 27 and the data carrier 26 to a length appropriate for reading and writing the data.

Upon activation of the rotary motor 35 and the rotary motor 39, the shaft core 24 is rotated together with the support shaft 221 to feed the adhesive sheet S, and the adhesive sheet S is adhered to the wafer W transported by the moving section 5.

The controller 6 controls the reader/writer 7 before the adhesion of the adhesive sheet S, and applies the electrical current to the loop antenna 274 so as to generate the magnetic flux M. Then, the controller 6 reads out the data stored in the data carrier 26, and controls the adhering apparatus 1 as a whole based on the data thus read out. In the process of the control, for example, based on the recommended feeding speed for feeding the adhesive sheet S out of the data stored in the data carrier 26, a rotation speed of each of the rotary motor 35 and the rotary motor 39 and a moving speed for moving the table 51 by the single-spindle robot 53 are determined. Additionally, based on the recommended pressing force, a vertical movement amount of a linear movement motor (not shown) that is configured to vertically move the pressing section 4 is determined and the pressing force can be set. At this moment, since the position of the antenna section 27 is adjusted so that the axis line C of the support shaft 221 is perpendicular to the antenna surface 273, the data carrier 26 is inevitably located at a position through which the magnetic flux M passes, regardless of the angle of the shaft core 24 relative to the axis line C at the time of supporting the shaft core 24 by the support shaft 221, and therefore the reader/writer 7 can read out the data stored in the data carrier 26 appropriately regardless of the angle of the shaft core 24 relative to the axis line C.

Alternatively, the controller 6 may be configured to control the reader/writer 7 to write the data in the data carrier 26 during the rotation of the shaft core 24 after the start of the adhesion of the adhesive sheet S so as to generate the magnetic flux M. Even when the shaft core 24 is being rotated as described above, the data carrier 26 is always located at a position through which the magnetic flux M passes. Thus, the reader/writer 7 can appropriately write the data in the data carrier 26. Examples of the data to be written in the data carrier 26 include the number of the used adhesive sheets S, the length of the used material sheet R and the like. It is to be noted that the length of the used material sheet R can be calculated with reference to the number of rotations of the rotary motor 35 or pulse of the rotary motor 35

After completion of the adhesion of the adhesive sheet S to the predetermined number of the wafers W, it is also possible to control the reader/writer 7 to write the data in the data carrier 26. Examples of the data to be written in the data carrier 26 include: the number of remaining adhesive sheets S after the start of feeding the adhesive sheet S, which is obtained by subtracting the number of used adhesive sheets S from the number of remaining adhesive sheets S before the start of feeding the adhesive sheet S; and the length of the remaining material sheet R.

In the support device 2 of the first exemplary embodiment, when the shaft core 24 is seen through the loop antenna 274 along the axis line C, the loop unit 274a is disposed in the vicinity of the shaft core 24. Therefore, it becomes easier for the magnetic flux M emitted from the loop antenna 274 to pass through the coiled antenna 26a of the data carrier 26. As a result, it is possible to achieve stable communication between the data carrier 26 and the loop antenna 274.

It is to be noted that, when a fixing contact plate for regulating the movement of the shaft core 24 is disposed near the substrate opening 272 of the substrate 271, it is difficult to dispose the loop antenna 274 near the substrate opening 272, and it is difficult to dispose the loop antenna 274 in the vicinity of the data carrier 26.

In the support device 2, the shaft core 24 is a hollow cylindrical member, and the loop unit 274a of the loop antenna 274 is a circular member. The diameter $L_D$ of the cylinder of the shaft core 24 is the same as the diameter $L_A$ of the loop unit 274a. Therefore, when the shaft core 24 is seen through the loop antenna 274 along the axis line C, a circle corresponding to the inner diameter or outer diameter of the cylinder of the shaft core 24 overlaps a circle corresponding to an innermost circumference or outermost circumference of the loop unit 274a. Thus, it is possible to further increase the amount of the magnetic flux M passing through the data carrier 26. Additionally, even when the shaft core 24 rotates about the axis line C, fluctuation in the degree of overlapping between the profile of the shaft core 24 and the profile of the loop unit 274a is suppressed. Accordingly, it is possible to further improve the accuracy of the communication between the data carrier 26 and the loop antenna 274. Additionally, even while the shaft core 24 is being rotated, the communication between the data carrier 26 and the loop antenna 274 can be stably performed.

In the support device 2, the data carrier 26 includes the coiled antenna 26a, and the longitudinal direction of the antenna 26a extends along the axis line C of the shaft core 24. Thereby, a larger amount of the magnetic flux M emitted from the loop antenna 274 toward the axis line C passes through the antenna 26a. Namely, it is possible to further increase the amount of magnetic flux M passing through the antenna 26a of the data carrier 26. Thus, it is possible to further improve the accuracy of the communication between the data carrier 26 and the loop antenna 274.

Second Exemplary Embodiment

Next, a second exemplary embodiment of the invention will be described. In the description below, the same reference numerals will be attached to the components, arrangements and means which are the same as those described above to simplify or omit the detailed description thereof.

Figure 3:
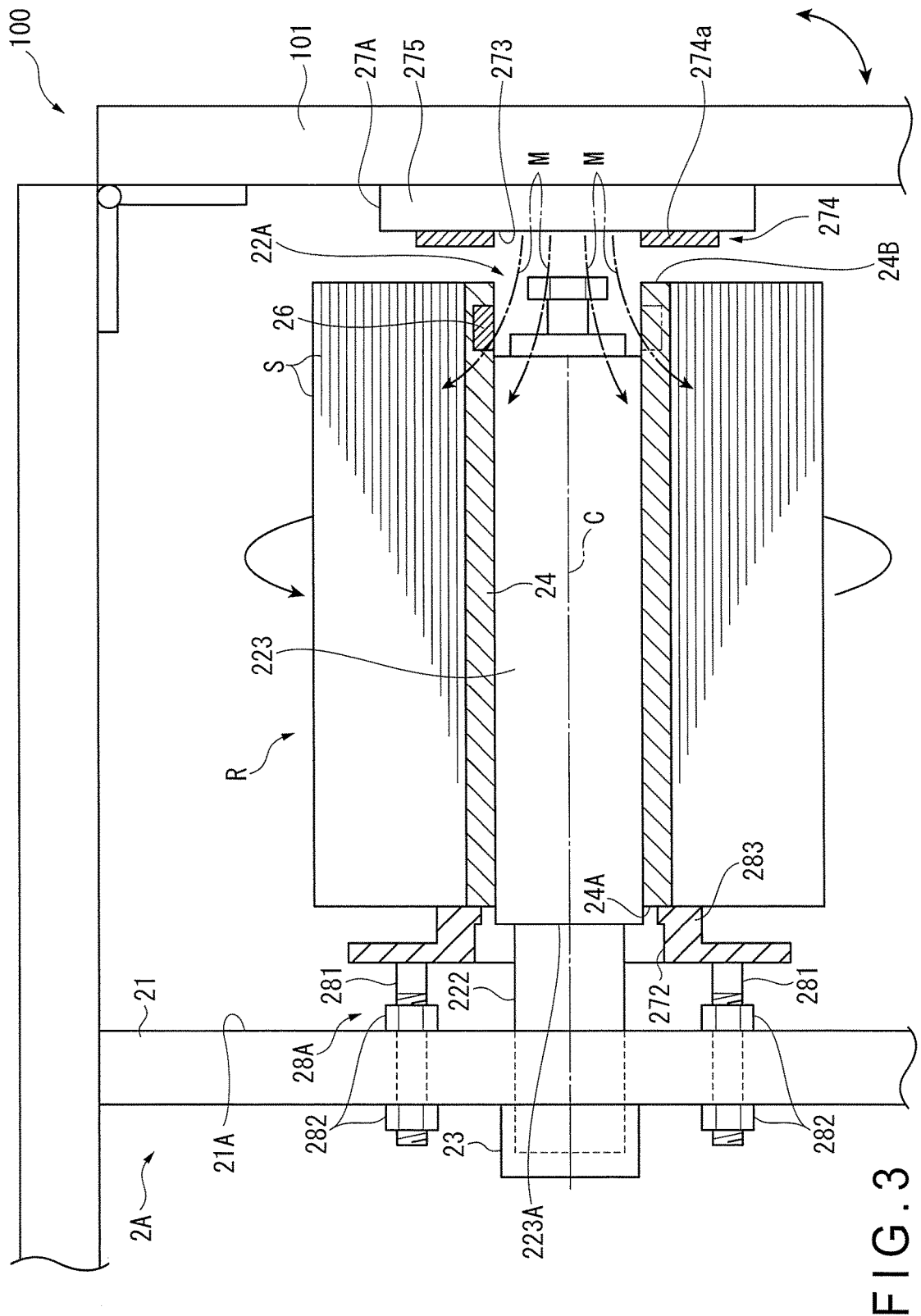
FIG. 3 is a partially sectioned view illustrating a support device according to a second exemplary embodiment of the invention.

FIG. 3 is a partially sectioned view illustrating a support device 2A according to the second exemplary embodiment.

The support device 2A is housed in a metallic casing 100. The frame 21 is fixed to an inside of the casing 100.

The antenna section 27A of the second exemplary embodiment is different from the antenna section 27 of the first exemplary embodiment in that, whereas the antenna section 27 is provided to the frame 21, the antenna section 27A of the second exemplary embodiment is provided to the inside of a door 101 of the casing 100. The antenna section 27A includes a substrate 275 on which an annular antenna is provided. The substrate 275 is fixed to the inside of the door 101 of the casing 100. The substrate 275 includes a first surface facing the inside of the door 101 and a second surface opposite to the first surface, and the second surface serves as the antenna surface 273 in the second exemplary embodiment. The antenna surface 273 is provided with the loop antenna 274. The loop antenna 274 includes a loop unit 274a defined by winding an electric conductor into a loop. In the second exemplary embodiment, the loop unit 274a is coiled to define a circle.

According to the second exemplary embodiment, the support 22A includes a cylindrical support shaft 223 and a base end 222 that is coaxial with the axis line C of the support shaft 223. The base end 222 extends from a first end portion 223A (see the left side in FIG. 3) at a first end of the support shaft 223. The base end 222 is rotatably supported by a rotary bearing 23. The support shaft 223 is preferably made of a material that allows passage of the magnetic flux M.

According to the second exemplary embodiment, the support device 2A is configured as described above, where the shaft core 24 in the second exemplary embodiment is supported in a manner different from that in the first exemplary embodiment.

The shaft core 24 has a first end portion 24A provided at a first end thereof, and a second end portion 24B provided at a second end thereof in an axial direction thereof. According to the second exemplary embodiment, the shaft core 24 is supported by the support shaft 223 so that the first end portion 24A is provided near the frame 21 and the second end portion 24B is provided near the door 101.

Since the data carrier 26 is provided near the second end portion 24B, the magnetic flux M emitted from the loop antenna 274 provided to the inside of the door 101 can pass through the data carrier 26.

An adjusting section 28A of the second exemplary embodiment includes two bolts 281 each of which is inserted into the frame 21, four nuts 282, and a contact plate 283 fixed by the two bolts 281. The two nuts 282 out of the four nuts 282 are screwed into one of the bolts 281, and the remaining two nuts 282 are screwed into the other of the bolts 281. The contact plate 283 is provided to the support shaft 223 near the first end portion 223A so as to regulate the movement of the shaft core 24. The adjusting section 28A is configured to adjust the position of the first end portion 24A along the axis line C of the support shaft 223. The first end portion 24A is brought into contact with the contact plate 283 so as to regulate the movement of the shaft core 24.

In the support device 2A of the second exemplary embodiment, in the same manner as the first exemplary embodiment, when the shaft core 24 is seen through the loop antenna 274 along the axis line C, the loop unit 274a is disposed in the vicinity of the shaft core 24. Therefore, it becomes easier for the magnetic flux M emitted from the loop antenna 274 to pass through the coiled antenna 26a of the data carrier 26. As a result, it is possible to achieve stable communication between the data carrier 26 and the loop antenna 274. It is to be noted that the antenna 26a is not shown in FIG. 3.

Further, in the support device 2A of the second exemplary embodiment, in the same manner as the first exemplary embodiment, when the shaft core 24 is seen through the loop antenna 274 along the axis line C, the circle corresponding to the inner diameter or outer diameter of the cylinder of the shaft core 24 overlaps the circle corresponding to the innermost circumference or outermost circumference of the loop unit 274a. As a result, it is possible to further improve the stability of the communication between the data carrier 26 and the loop antenna 274 also in the support device 2A. Additionally, even while the shaft core 24 is being rotated, the communication between the data carrier 26 and the loop antenna 274 can be stably performed.

Further, in the support device 2A, since the antenna section 27A is provided to the door 101, a degree of freedom in positioning the loop antenna 274 is increased, and it becomes easier to dispose the loop antenna 274 at the position where the communication between the data carrier 26 and the loop antenna 274 is further improved. Furthermore, when the shaft core 24 provided with the data carrier 26 is disposed on the support shaft 223, since the data carrier 26 is provided near the second end portion 24B, the possibility of the IC chip being broken due to the contact between the data carrier 26 and the support shaft 223 is decreased.

Further, in the support device 2A, since the antenna section 27A is provided to the door 101 and the position of each of the shaft core 24 and the antenna section 27A is easily moved along the axis line C, it is possible to reduce the influence from the metallic member. For example, when the adjusting section 28A is used to move the contact plate 283 toward the frame 21, it becomes possible to move the shaft core 24 toward the frame 21, so that space between the inside of the door 101 and the second end portion 24B is increased. In accordance with the movement of the shaft core 24, it also becomes possible to dispose the loop antenna 274 at a position remote from the door 101. Since each of the loop antenna 274 and the data carrier 26 can be disposed at a position remote from the frame 21 and the door 101, even when the frame 21 and the door 101 are made of metal, stable communication can be achieved.

Third Exemplary Embodiment

Next, a third exemplary embodiment of the invention will be described. In the description below, the same reference numerals will be attached to the components, arrangements and means which are the same as those described above to simplify or omit the detailed description thereof.

A support device in the third exemplary embodiment has the same arrangement as those of the support devices in the first and second exemplary embodiments except that the shape and position of the loop antenna are different from those of the loop antenna 274 of each of the first and second exemplary embodiments.

Figure 4:
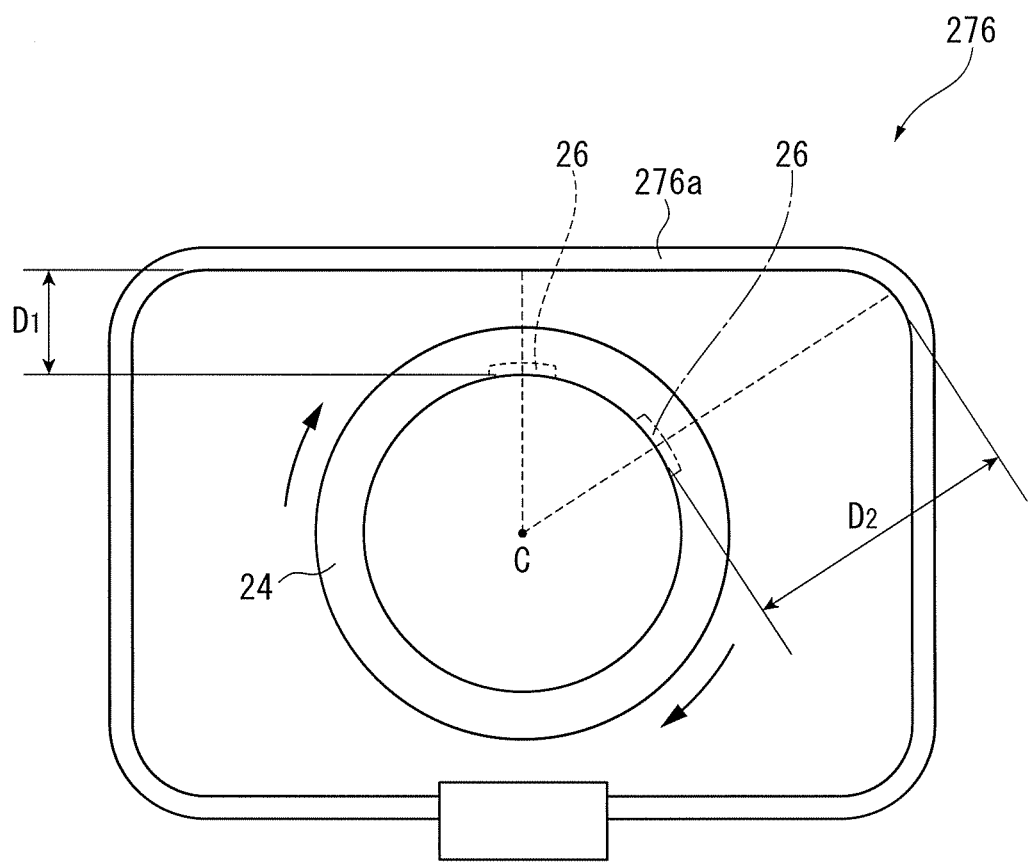
FIG. 4 illustrates an arrangement of a loop antenna and a data carrier according to a third exemplary embodiment of the invention.

FIG. 4 schematically shows a positional relationship between a loop antenna 276 and the shaft core 24 in the third exemplary embodiment. Specifically, FIG. 4 shows the location of the shaft core 24 seen through the loop antenna 276 along the axis line C.

Also in the third exemplary embodiment, the loop antenna 276 includes a loop unit 276a defined by winding an electric conductor into a loop. In the third exemplary embodiment, the loop unit 276a is coiled to define a substantially rectangular shape as shown in FIG. 4. Further, as shown in FIG. 4, the shaft core 24 is located inside the loop of the loop unit 276a such that the loop unit 276a is disposed in the vicinity of the shaft core 24. As a result, it is possible to achieve stable communication between the data carrier 26 and the loop antenna 274.

A distance D from a position on an inner circumference of the shaft core 24 at which the data carrier 26 is provided to the inner circumference of the loop of the loop unit 276a changes while the shaft core 24 is rotated about the axis line C. As shown in FIG. 4, when the distance D is short, the distance D is denoted by $D_1$, and when the distance D is long, the distance D is denoted by $D_2$. In order to pass the magnetic flux generated by the loop antenna 276 through the data carrier 26, the distance $D_2$ is preferably 80 mm or less, more preferably 70 mm or less. When the distance $D_2$ is more than 80 mm, communication between the loop antenna 276 and the data carrier 26 may not be achieved.

Modification of Exemplary Embodiment

Although the best arrangement and method for implementing the invention have been disclosed above, the invention is not limited thereto. In other words, while the invention has been mainly illustrated and described on the specific exemplary embodiments, a person skilled in the art can modify the arrangements such as shape, material, quantity and the like of the above-described exemplary embodiments without departing from the technical idea and scope of the invention. The description limiting the shapes and the materials disclosed above is intended to be illustrative for easier understanding and not to limit the invention, hence the invention includes the description using a name of component without a part of or all of the limitation on the shape and the material etc.

Although the data carrier 26 is provided to the inner circumferential surface of the shaft core 24 in the first exemplary embodiment, the invention is not limited to such an arrangement. For example, the data carrier 26 may be provided to an outer circumferential surface of the shaft core 24. In this case, it is preferable that the diameter of the cylinder (i.e., outer diameter) of the shaft core 24 is the same as the diameter (inner diameter) of the loop unit 274a. In the case where the diameter of the cylinder (i.e., outer diameter) of the shaft core 24 is the same as the diameter (inner diameter) of the loop unit 274a as described above, when the shaft core 24 is seen through the loop antenna 274 along the axis line C, the circle of the cylinder of the shaft core 24 overlaps the circle of the loop unit 274a. As a result, since the amount of the magnetic flux M passing through the data carrier 26 is increased, stable communication can be achieved.

Although the substrate 275 is fixed to the inside of the door 101 of the casing 100 in the second exemplary embodiment, the invention is not limited to such an arrangement. For example, the substrate 275 may not be fixed to the door 101, but may be transported to the vicinity of the shaft core 24 by a transport unit. In this case, it is preferable that, after the shaft core 24 is supported by the support shaft 223, the substrate 275 is moved by the transport unit, such that the position of each of the loop unit 274a and the shaft core 24 is adjusted in accordance with the arrangement of the second exemplary embodiment.

Although the loop unit of the loop antenna has the circular or rectangular shape in the first to third embodiments, the invention is not limited thereto. The loop unit may be, for example, in the shape of an ellipse, square, polygon, or an indefinite shape. Moreover, it is not necessary that the axis line C of the support shaft 221 passes through the center of the loop antenna 274.

The data carrier 26 may be configured only to store the data or only to transmit the data.

The type and material of the adhesive sheet S of the invention are not particularly limited, but an intermediate layer may be interposed between the base sheet BS and the adhesive agent layer AD in adhesive sheet S, for example. Alternatively, the adhesive sheet S may include three or more layers including other layers. The adhesive sheet S may be a protection sheet, dicing tape, die attach film, or the like. Here, the semiconductor wafer is exemplified by a silicon semiconductor wafer and a compound semiconductor wafer. An adhesive sheet to be adhered to such a semiconductor wafer is not limited to the protection sheet, dicing tape and die attach film. An adhesive sheet intended for any purpose and having any shape, including any sheet, film, tape, or the like, may be applicable. Further, a plate-like member may be a substrate for an optical disc, and the adhesive sheet may have a resin layer serving as a recording layer. As described above, the plate-like member may be not only a glass plate, steel plate, resin plate, and other members, but also members and articles in any form.

Further, the pressing section 4 may include components other than the components described in the above exemplary embodiments. The pressing section 4 is not particularly limited as long as the adhesive sheet can be adhered to the plate-like member. For example, the pressing section 4 may be a blade-shaped member, an air-jet type member, or other member made of rubber, resin, sponge, or the like.

The drive device in the above exemplary embodiments may be: motorized equipment such as a rotary motor, linear movement motor, linear motor, single-spindle robot and multi-joint robot; an actuator such as an air cylinder, hydraulic cylinder, rodless cylinder and rotary cylinder; and a direct or indirect combination thereof (some of the drive devices overlap with the exemplified drive devices in the exemplary embodiments).

Although the adhesive sheet is adhered to the semiconductor wafer in the above exemplary embodiments, the invention is not limited thereto.

The invention claimed is:

1. A support device for a belt-shaped sheet that is configured to support a belt-shaped sheet wound around a shaft core having a hollow cylindrical shape in a manner capable of feeding the belt-shaped sheet, the support device comprising:
    a support shaft configured to be inserted into a hollow part of the shaft core;
    a frame that is configured to support the support shaft;
    a non-contact data carrier provided to an inner circumferential surface or an outer circumferential surface of the shaft core along an axial line of the support shaft;
    an antenna surface perpendicular to the axis line of the support shaft; and
    a loop antenna provided on the antenna surface, wherein the shaft core is provided with the data carrier capable of at least one of storing and transmitting predetermined data,
    the loop antenna comprises a loop unit coiled to define a loop so as to surround the axis line, and
    the loop unit of the loop antenna is disposed in the vicinity of the shaft core when the shaft core is seen through the loop antenna along the axis line.

2. The support device for a belt-shaped sheet according to claim 1, wherein
    the shaft core has a first end portion provided at a first end and a second end portion provided at a second end in an axial direction of the shaft core,
    the frame is provided near the first end portion, and
    the antenna surface is provided near the second end portion.

3. The support device for a belt-shaped sheet according to claim 1, wherein
    a profile of the shaft core overlaps a profile of the loop unit of the loop antenna when the shaft core is seen through the loop antenna along the axis line.

4. The support device for a belt-shaped sheet according to claim 1, wherein
    the loop unit has a circular shape, and
    a diameter of a cylinder of the shaft core is the same as a diameter of the loop unit.

5. The support device for a belt-shaped sheet according to claim 1, wherein
    the data carrier comprises a coiled antenna, and
    a longitudinal direction of the coiled antenna extends along the axis line.

6. The support device for a belt-shaped sheet according to claim 1, wherein the inner circumferential surface or the outer circumferential surface has a cavity, and the data carrier is housed in the cavity.

7. A method for managing a belt-shaped sheet that is supported by a supporting device in a manner capable of being fed, the supporting device comprising a support shaft configured to be inserted into a hollow part of a shaft core having a hollow cylindrical shape, a frame that is configured to support the support shaft, an antenna surface perpendicular to an axis line of the support shaft, and a loop antenna provided on the antenna surface and having a loop unit coiled to define a loop so as to surround the axis line, the method comprising:
    winding the belt-shaped sheet around the shaft core;
    providing a data carrier capable of at least one of storing and transmitting predetermined data to an inner circumferential surface or an outer circumferential surface of the shaft core along the axis line of the support shaft;
    disposing the loop unit of the loop antenna in the vicinity of the shaft core when the shaft core is seen through the loop antenna along the axis line; and
    performing at least one of storing and transmitting of the predetermined data between the data carrier and the loop antenna.

8. An apparatus comprising:
    a sheet roll comprising
        a shaft core having a hollow cylindrical shape and having a rotational axis along which the shaft core extends,
        a sheet wound around the shaft core, and
        a non-contact data carrier disposed in an inner circumferential surface or an outer circumferential surface of the shaft core, and extending along the rotational axis, and the inner or outer circumferential surface; and
    a sheet feeder feeding the sheet from the sheet roll, comprising
        a support shaft to be inserted into a hollow part of the shaft core,
        a frame supporting the support shaft, and
        an antenna substrate having a loop antenna for communicating with the non-contact data carrier, the loop antenna comprising a conductor which is so wound to surround the rotational axis.

* * * * *